United States Patent [19]
Staser et al.

[11] Patent Number: 5,890,321
[45] Date of Patent: Apr. 6, 1999

[54] WINDOW REGULATOR MOUNTING PANEL

[75] Inventors: Brian Hale Staser, Troy; Dan William Figlioli, Macomb Township, both of Mich.

[73] Assignee: General Motors Corporation, Detroit, Mich.

[21] Appl. No.: 738,854

[22] Filed: Oct. 28, 1996

Related U.S. Application Data

[63] Continuation-in-part of Ser. No. 693,596, Aug. 5, 1996, abandoned.

[51] Int. Cl.$^6$ ....................................................... B60J 5/04
[52] U.S. Cl. ................................................ 49/502; 49/352
[58] Field of Search .............................. 49/348, 349, 350, 49/351, 352, 375, 502

[56] References Cited

U.S. PATENT DOCUMENTS

| | | | |
|---|---|---|---|
| 5,251,403 | 10/1993 | Compeau et al. | 49/502 |
| 5,581,952 | 12/1996 | Kapes et al. | 49/502 |
| 5,584,144 | 12/1996 | Hisano | 49/502 |

FOREIGN PATENT DOCUMENTS

| | | | |
|---|---|---|---|
| 579 535 A1 | 7/1993 | European Pat. Off. | B60J 5/04 |
| 712 746 A1 | 10/1995 | European Pat. Off. | B60J 5/04 |
| 94/03341 | 2/1994 | WIPO | B60J 5/04 |

*Primary Examiner*—Daniel P. Stodola
*Assistant Examiner*—Curtis Cohen
*Attorney, Agent, or Firm*—Charles E. Leahy

[57] ABSTRACT

A mounting device is provided for mounting a window regulator drive unit on a molded plastic mounting panel. A plurality of flexible tabs are molded integral with the mounting panel and adapted to engage with the window regulator drive unit to retain the drive unit on the mounting panel. A molded plastic cap is adapted to fit over the drive unit and has integrally molded mounting fingers for engaging with complimentary integrally molded mounting fingers provided on the mounting panel so that rotation of the plastic cap causes inter-engagement of the mounting fingers and the drive unit is captured between the cap and the mounting panel. The cap has slots therein which become engaged with projecting lugs of the flexible tabs upon rotation of the cap relative to the mounting panel so that the flexible tabs become blocked and cannot be disengaged from their respective engagement with the drive unit. In addition, at least one of the mounting fingers has a ramp surface thereon so that the cap progressively wedges the cap into tighter engagement with the mounting panel to further assure retention of the cap on the mounting panel.

4 Claims, 5 Drawing Sheets

WINDOW REGULATOR MOUNTING PANEL

This is a continuation-in-part of Ser. No. 08/693,596, filed Aug. 5, 1996, now abandoned.

FIELD OF THE INVENTION

The invention relates to a window regulator and, more particularly, provides a cap for retaining a motor assembly or manual drive unit on a molded plastic mounting panel.

BACKGROUND OF THE INVENTION

In Compeau et al., a molded plastic mounting panel is provided for mounting a window and a window regulator in a vehicle door. The mounting panel is comprised of a one-piece plastic molded member having a central planar mounting plate adapted to mount the window regulator, and a plurality of spaced apart spokes molded integrally with the center planar mounting plate and radiating generally forwardly and/or rearwardly therefrom to mount a guide channel. The guide channel receives the edges of the window.

The window guide channels are integrally molded with the radiating spokes. The spokes are hollow tubular members of generally circular cross section. A plurality of aperture mounting brackets are molded integrally with the spokes for receiving fasteners by which the mounting panel is mounted on the vehicle door. A plurality of snap fasteners are integrally molded with the mounting panel for snap together fastening of such door operating hardware as the window regulator, window regulator motor (in cases of powered operation), door handle and door latch control rods.

The present invention provides a new and improved mounting device for reliably mounting the window regulator on the mounting panel.

SUMMARY OF THE INVENTION

According to the invention, a mounting device is provided for mounting a window regulator drive unit on a molded plastic mounting panel. A plurality of flexible tabs are molded integral with the mounting panel and adapted to engage with the window regulator drive unit to retain the drive unit on the mounting panel. A molded plastic cap is adapted to fit over the drive unit and has integrally molded mounting fingers for engaging with complimentary integrally molded mounting fingers provided on the mounting panel so that rotation of the plastic cap causes interengagement of the mounting fingers and the drive unit is captured between the cap and the mounting panel. The cap has slots therein which become engaged with projecting lugs of the flexible tabs upon rotation of the cap relative to the mounting panel so that the flexible tabs become blocked and cannot be disengaged from their respective engagement with the drive unit.

In addition, at least one of the mounting fingers has a ramp surface thereon so that rotation of the cap progressively wedges the cap into tighter engagement with the mounting panel to further assure retention of the cap on the mounting panel.

DETAILED DESCRIPTION OF THE DRAWINGS

Figure 1:
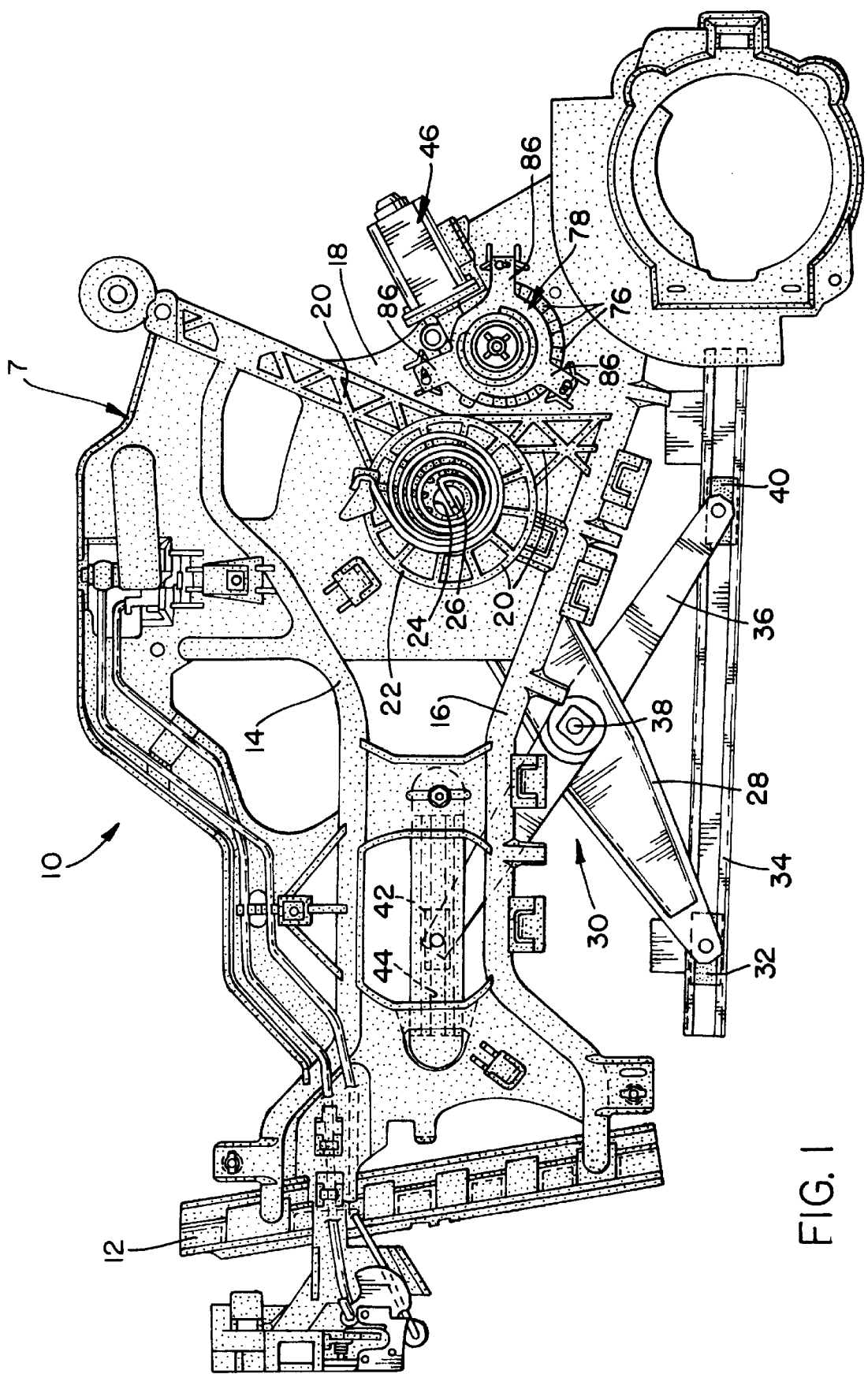
FIG. 1 is a front elevational view of a mounting panel having a motor powered window regulator drive unit according to the present invention.

Referring to FIG. 1, a module 10 for a vehicle door is comprised of various door hardware elements mounted on a one-piece molded plastic mounting panel generally indicated at 7. The mounting panel 7 includes integrally molded rear guide channel 12 with a plurality of hollow tubular spokes 14 and 16.

The mounting panel 7 also includes a generally planar window regulator mounting plate 18 which is an integrally molded part of the mounting panel 7 and spans between the spokes 14 and 16. The mounting plate 18 is reinforced by a network of strengthening ribs 20. The network of ribs 20 also defines a circular hub 22 having a bore 24 in which a metal pivot shaft 26 is rotatable. The shaft 26 is nonrotatably attached to a stamped steel regulator lift arm 28 of a window regulator, generally indicated at 30.

The arm 28 carries a slide 32 on an end thereof which rides in a sash channel 34 attached to a window pane (not shown). The window regulator 30 also includes a regulator arm 36 which is pivotally connected to the arm 28 by a pin 38. The arm 36 has a slide 40 carried thereon which rides in the channel 34. The arm 36 also has a slide 42 pivotally carried on the other end thereof which rides in a slot 44.

The mounting panel 7 also has integral features which enable the mounting of a drive unit, in particular a motor assembly 46 for operating the window regulator 30. As seen in FIGS. 1–4, the motor assembly 46 includes a gear box 48 having mounting lugs 50, 52 and 54 spaced around the circumference thereof. The motor assembly 46 is assembled to the mounting plate 18 with the gear box 48 juxtaposed with the face of the mounting plate 18. A pinion gear 56, seen in FIG. 4, extends into a cup shaped journal portion 58 of the mounting plate 18 and seats within an aperture 59. The journal portion 58 has an open side by which the teeth (not shown) of an arcuate sector (not shown) carried by the arm 28 engage with the pinion gear 56.

The motor assembly 46 is anchored against rotation by a series of cylindrical studs 60 which project from the mounting plate 18. The studs 60 penetrate into corresponding bores 62 of the lugs 50, 52 and 54. The motor assembly 46 is fastened against removal by resilient snap tabs 64 which project laterally from the mounting plate 18. Each tab 64 has an undercut shoulder 66 for engagement with the lugs 50, 52 and 54. A pair of backup abutments shoulders 68 which are separated but closely spaced from each tab 64 prevent the overtravel of the tabs 64. The motor assembly 46 is installed upon the mounting panel 7 by thrusting the gear box 48 in a direction toward the mounting plate 18. The lugs 50, 52 and 54 push the tabs 64 radially outward until such time that the tabs 64 can return to their original position placing the shoulder 66 over the lugs 50, 52 and 54 as seen in FIG. 4.

Figure 2:
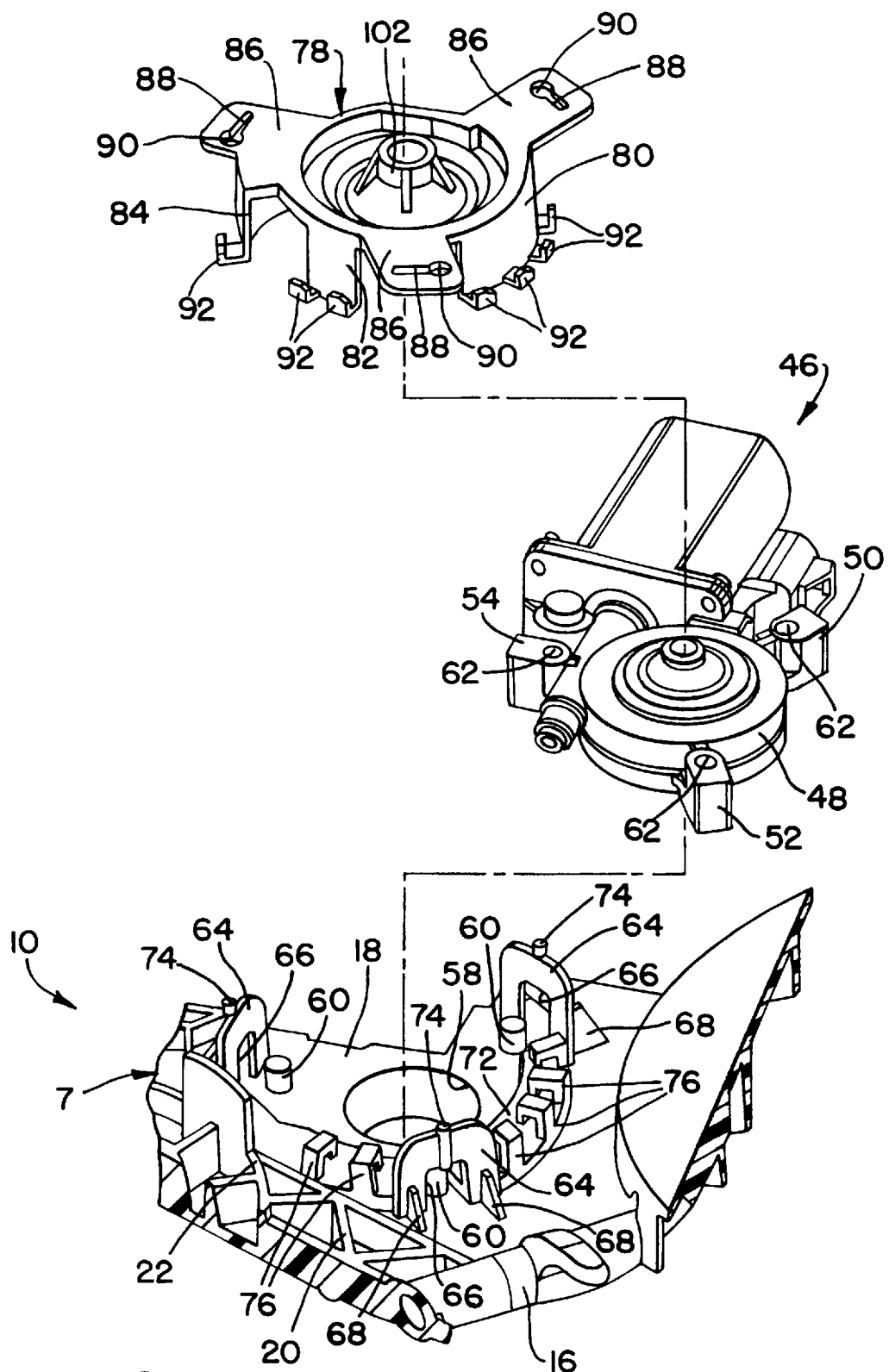
FIG. 2 is an enlarged exploded view of a portion of the mounting panel of FIG. 1.
Figure 3:
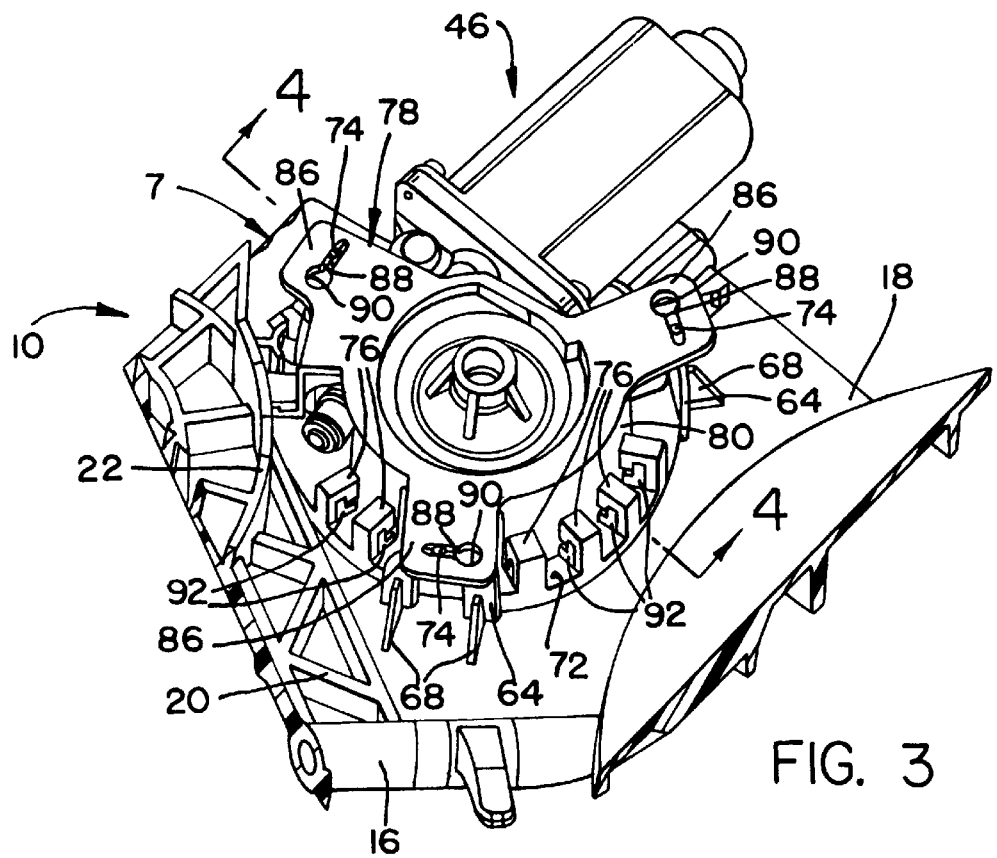
FIG. 3 is a perspective assembled view of a portion of the mounting panel as shown in FIG. 2.
Figure 4:
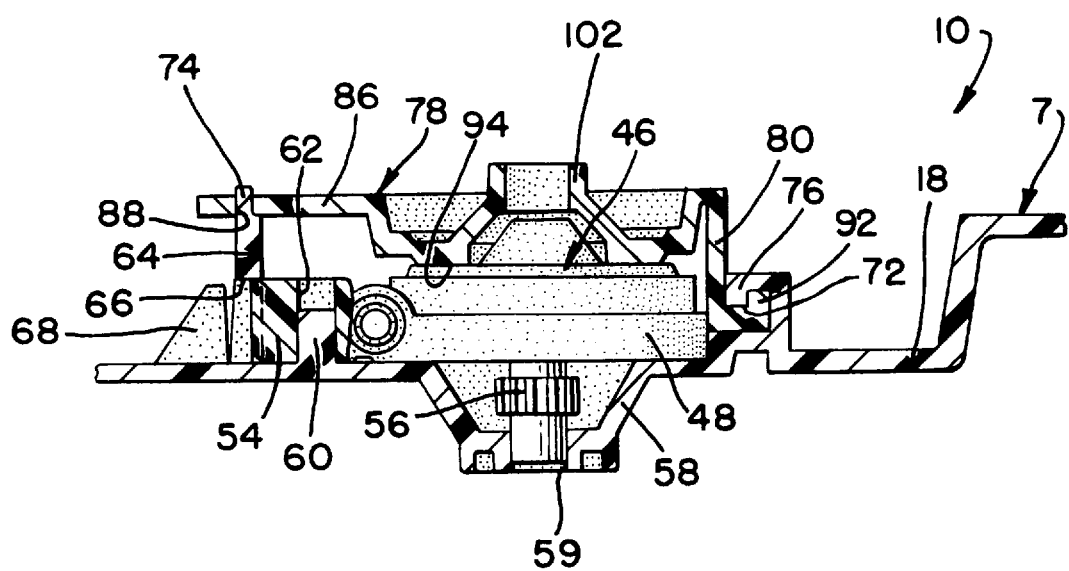
FIG. 4 is a section view taken in the direction of arrows 3—3 of FIG. 4.

According to the invention, as best seen in FIGS. 2, 3 and 4, a structural molded cap 78 is provided to capture and further retain the motor assembly 46 on the mounting plate 18. The cap 78 has three depending skirts 80, 82 and 84 which terminate with upturned fingers 92. The cap 78 also has three wings 86 having elongated arcuate slots 88 with enlarged access openings 90.

After assembly of the motor assembly 46 to the mounting plate 18, the cap 78 is then brought over the gear box 48 with the openings 90 of the wings 86 fitting over studs 74 which are provided on each of the tabs 64. The cap 78 is then rotated counterclockwise so that the upturned fingers 92 of the cap 78 are carried into engagement beneath a plurality of downturned fingers 76 provided on the mounting plate 18 to thereby lock the cap 78 to the mounting plate 18. In addition, the downturned fingers 76 preferably having upward facing ramp surfaces 72 which causes a progressive interference with the underside of upturned fingers 92 during rotation of the cap 78. Simultaneously, this rotation of the cap 78 causes the stud projections 74 to be tightly captured within the slots 88 to lock the tabs 64 in engagement with the lugs 50, 52 and 54 of the motor assembly 46. The cap 78 has a lower annular wall 94 which captures the gear box 48 of motor assembly 46 between the cap 78 and the mounting plate 18 in a compressive arrangement.

Figure 6:
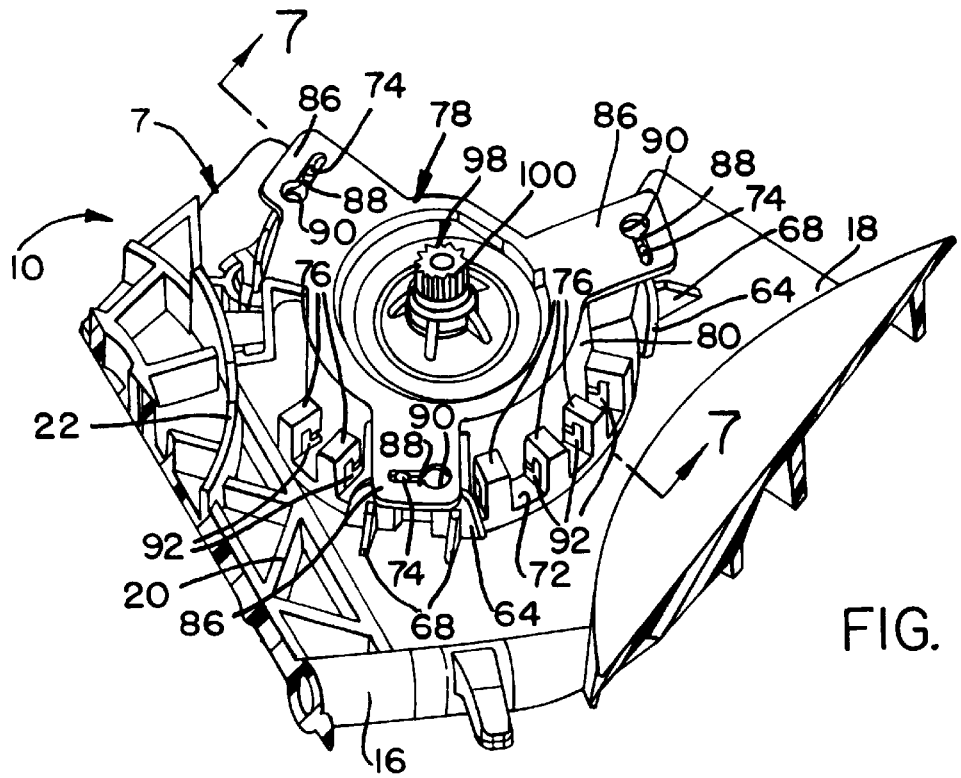
FIG. 6 is a perspective assembled view of the mounting panel of FIG. 5.
Figure 7:
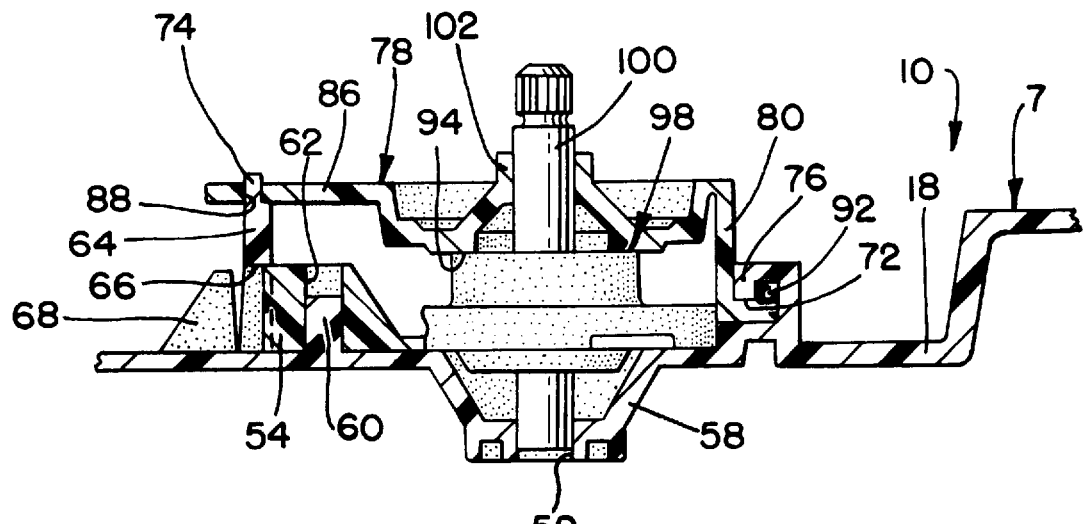
FIG. 7 is a section view taken in the direction of arrows 7—7 of FIG. 6.
Figure 5:
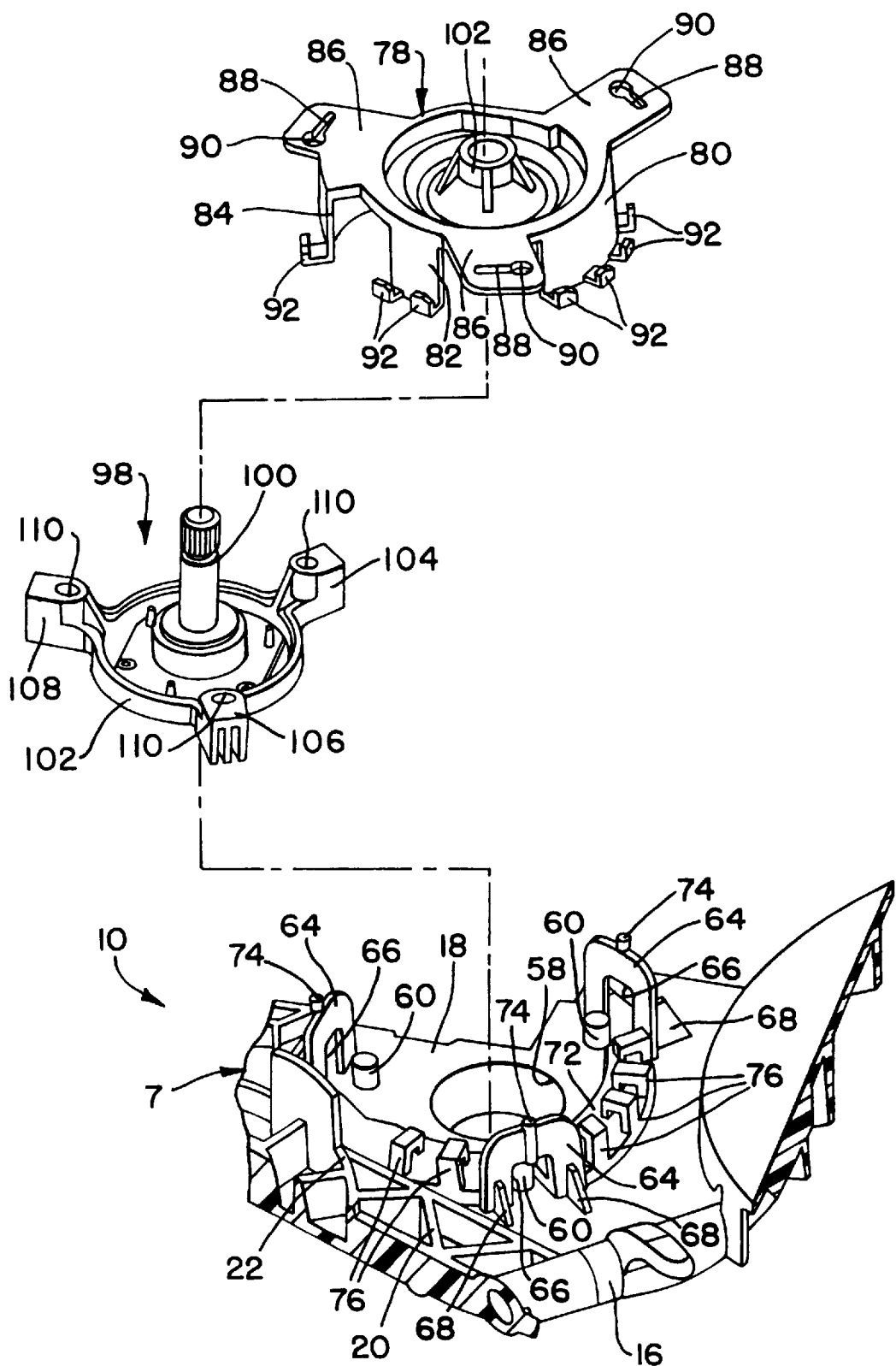
FIG. 5 is an exploded view similar to FIG. 2 of a second embodiment of the invention, but showing a mounting panel having manual window regulator.

Referring now to FIGS. 5, 6 and 7, it will be seen that the invention may also be utilized in conjunction with a manual drive unit 98 which is a window regulator of the type in which a crank is rotated in order to raise and lower the window. In particular, as seen in FIG. 5, a manual spindle 100 is rotatably mounted on a plastic base 102 which includes circumferentially spaced mounting lugs 104, 106 and 108, each having a bore 110. In comparing FIG. 5 with FIG. 2, it will be appreciated that the lugs of the manual assembly are positioned identically with the lugs 50, 52 and 54 of the motor assembly 46 so that the manual drive 98 can be snap installed onto the same mounting plate 18 as discussed herein before. Furthermore, the retaining cap 78, discussed hereinbefore, is readily installed over the manual drive 98 to capture and retain the manual drive unit 98 on the mounting panel 7.

Thus, it is seen that the invention provides a new and improved window regulator mounting panel in which a molded plastic structural cap is employed to securely retain a window drive's unit, which may be either a motor assembly or a manual window drive unit in place on the mounting panel.

In the preferred embodiment discussed herein, the cap and the mounting panel have inter-engaging fingers which become engaged upon rotation of the cap to lock the cap to the mounting panel. However, it would apparent to a person of ordinary skill in the art that other types of twist lock structures may be employed to effect the rotary engagement between the cap and the mounting panel. Furthermore, although the preferred embodiment specifically teaches the provision of slots 88 on the cap and stud projections 74 on the flexible tabs 64, it would be apparent to a person of ordinary skill in the art that other forms of engagement may be obtained between the cap and the flexible tabs upon rotation of the cap in order to block the flexible tabs and thereby assure their engagement on the lugs of the drive unit.

What is claimed is:

1. In a vehicle door having a window regulator drive unit and a molded plastic mounting panel, a mounting device mounting the window regulator drive unit on the molded plastic mounting panel comprising;

a plurality of flexible tabs molded integral with the mounting panel and engaged with the window regulator drive unit to retain the drive unit on the mounting panel and being flexible a direction away from the drive unit to disengage from the drive unit for unmounting of the drive unit from the molded plastic mounting panel;

a molded plastic cap fitted over the drive unit and having integrally molded mounting fingers for engaging with the mounting panel to retain the cap to the mounting panel so that the drive unit is captured between the cap and the mounting panel; and the molded plastic cap engaging with the flexible tabs to block flexure of the flexible tabs in the direction to disengage from the drive unit.

2. The mounting device of claim 1 further characterized by the mounting fingers of the cap being engaged with the mounting panel upon rotation of the cap relative to the mounting panel and the molded plastic cap having slots therein and the flexible tabs having a projecting portion which becomes engaged within the slots of the cap upon rotation of the cap relative to the mounting panel.

3. The mounting device of claim 2 further characterized by the mounting panel having integrally mounted fingers thereon which are engaged by the mounting fingers of the cap upon rotation of the cap to retain the cap on the mounting panel.

4. The mounting device of claim 3 further characterized by at least one of the mounting fingers having a ramped surface thereon so that the progressive rotation of the cap progressively wedges the cap into engagement with the mounting panel to assure retention of the cap on the mounting panel.

\* \* \* \* \*